(12) United States Patent
Kobel et al.

(10) Patent No.: US 11,477,207 B2
(45) Date of Patent: Oct. 18, 2022

(54) CONFIGURABLE FEATURE LEVEL CONTROLS FOR DATA

(71) Applicant: Elasticsearch B.V., Mountain View, CA (US)

(72) Inventors: Brandon Kobel, Goleta, CA (US); Lawrence Everett Gregory, IV, Schenectady, NY (US)

(73) Assignee: Elasticsearch B.V., Mountain View, CA (US)

( * ) Notice: Subject to any disclaimer, the term of this patent is extended or adjusted under 35 U.S.C. 154(b) by 562 days.

(21) Appl. No.: 16/299,404

(22) Filed: Mar. 12, 2019

(65) Prior Publication Data

US 2020/0296110 A1    Sep. 17, 2020

(51) Int. Cl.
*H04L 29/06* (2006.01)
*H04L 9/40* (2022.01)
*G06F 16/953* (2019.01)
*G06F 21/62* (2013.01)

(52) U.S. Cl.
CPC .......... *H04L 63/105* (2013.01); *G06F 16/953* (2019.01); *G06F 21/629* (2013.01); *G06F 21/6218* (2013.01)

(58) Field of Classification Search
CPC .. G06F 16/953; G06F 21/6218; G06F 21/629; H04L 63/105
USPC .......................................................... 726/4
See application file for complete search history.

(56) References Cited

U.S. PATENT DOCUMENTS

| | | | |
|---|---|---|---|
| 8,412,237 B1* | 4/2013 | Ohme | H04W 4/027 455/456.3 |
| 8,683,490 B2 | 3/2014 | Endrikhovski et al. | |
| 8,930,581 B2* | 1/2015 | Anton | H04L 29/06 709/250 |
| 9,143,530 B2* | 9/2015 | Qureshi | H04L 9/0891 |
| 9,432,379 B1* | 8/2016 | Roche | H04L 63/102 |
| 10,044,695 B1* | 8/2018 | Cahill | H04L 63/08 |

(Continued)

OTHER PUBLICATIONS

Hinterreiter, Daniel. "Supporting feature-oriented development and evolution in industrial software ecosystems." In Proceedings of the 22nd International Systems and Software Product Line Conference—vol. 2, pp. 79-86. 2018. (Year: 2018).*

(Continued)

*Primary Examiner* — Luu T Pham
*Assistant Examiner* — Walter J Malinowski
(74) *Attorney, Agent, or Firm* — Quinn IP Law

(57) ABSTRACT

Methods and systems for providing configurable feature level controls for data. The data can be associated with data visualization and analysis in a distributed search engine environment. An example method comprises providing a user interface for enabling a selection of a type of access to grant for each feature of a plurality of features, the selection being on a feature-by-feature basis and the selection being assigned to selected roles; and in response to the selection of the type of access, automatically controlling the type of access to each of the features including determining whether a user has any role to which a particular feature has been assigned; and based on the determining, for users having any of the selected roles, permitting the type of access selected for the particular feature assigned to the selected roles. The types of access may comprise read-only, full, no access, or differing levels of access.

17 Claims, 15 Drawing Sheets

(56) References Cited

U.S. PATENT DOCUMENTS

| | | | |
|---|---|---|---|
| 10,109,086 B1 | 10/2018 | Bakshi et al. | |
| 10,756,959 B1 | 8/2020 | Makwarth et al. | |
| 10,782,860 B2 | 9/2020 | Neirynck | |
| 11,240,126 B2 | 2/2022 | Makwarth et al. | |
| 11,341,274 B2* | 5/2022 | Ewing | H04L 63/102 |
| 2004/0054723 A1* | 3/2004 | Dayal | H04L 67/1068 |
| | | | 709/204 |
| 2004/0267600 A1* | 12/2004 | Horvitz | G06Q 30/0204 |
| | | | 705/7.31 |
| 2005/0216865 A1 | 9/2005 | Rollin et al. | |
| 2006/0117390 A1* | 6/2006 | Shrivastava | H04L 61/1523 |
| | | | 726/27 |
| 2006/0224989 A1* | 10/2006 | Pettiross | G06F 3/0481 |
| | | | 715/779 |
| 2007/0124374 A1* | 5/2007 | Arun | G06Q 10/10 |
| | | | 709/204 |
| 2007/0226204 A1 | 9/2007 | Feldman | |
| 2008/0120565 A1 | 5/2008 | Stiso et al. | |
| 2008/0243766 A1* | 10/2008 | Nowlan | H04W 8/245 |
| 2009/0027418 A1 | 1/2009 | Maru et al. | |
| 2009/0175509 A1* | 7/2009 | Gonion | G06K 9/6253 |
| | | | 382/118 |
| 2010/0070448 A1* | 3/2010 | Omoigui | H01L 27/14645 |
| | | | 706/55 |
| 2011/0023082 A1* | 1/2011 | Narasinghanallur | |
| | | | G06F 21/6218 |
| | | | 726/1 |
| 2011/0153186 A1 | 6/2011 | Jakobson | |
| 2011/0208766 A1* | 8/2011 | Lang | G06Q 10/10 |
| | | | 707/759 |
| 2011/0261049 A1* | 10/2011 | Cardno | G06Q 10/10 |
| | | | 345/419 |
| 2013/0127877 A1 | 5/2013 | Blas, Jr. et al. | |
| 2013/0254699 A1 | 9/2013 | Bashir et al. | |
| 2013/0346367 A1 | 12/2013 | Trugman et al. | |
| 2014/0082093 A1 | 3/2014 | Savage | |
| 2014/0109193 A1* | 4/2014 | Desai | G06F 21/6281 |
| | | | 726/4 |
| 2014/0125672 A1 | 5/2014 | Winternitz et al. | |
| 2014/0181222 A1 | 6/2014 | Geris et al. | |
| 2014/0215443 A1 | 7/2014 | Voccio et al. | |
| 2014/0250234 A1* | 9/2014 | Liesche | H04W 4/70 |
| | | | 709/228 |
| 2014/0365511 A1 | 12/2014 | Burrows et al. | |
| 2014/0379648 A1 | 12/2014 | Chiu | |
| 2014/0380237 A1 | 12/2014 | Kroupa et al. | |
| 2015/0007252 A1* | 1/2015 | Kazachkov | G06F 21/577 |
| | | | 726/1 |
| 2015/0009234 A1 | 1/2015 | Johnson et al. | |
| 2015/0026208 A1* | 1/2015 | Kuhmuench | G06F 21/629 |
| | | | 707/769 |
| 2015/0070351 A1 | 3/2015 | Tarquini et al. | |
| 2015/0127637 A1 | 5/2015 | Cavanagh et al. | |
| 2015/0220594 A1 | 8/2015 | Leyba | |
| 2015/0269499 A1 | 9/2015 | B et al. | |
| 2015/0363733 A1 | 12/2015 | Brown | |
| 2015/0370839 A1 | 12/2015 | Bareket et al. | |
| 2016/0011751 A1 | 1/2016 | Moses et al. | |
| 2016/0057159 A1* | 2/2016 | Yin | H04L 63/145 |
| | | | 726/23 |
| 2016/0182328 A1 | 6/2016 | Bhasin et al. | |
| 2016/0188663 A1 | 6/2016 | Tsumura et al. | |
| 2016/0241676 A1 | 8/2016 | Armstrong et al. | |
| 2016/0283085 A1 | 9/2016 | Beausoleil et al. | |
| 2017/0075919 A1 | 3/2017 | Bose et al. | |
| 2017/0147790 A1* | 5/2017 | Patel | H04L 63/105 |
| 2017/0169611 A1 | 6/2017 | Ramirez Flores et al. | |
| 2017/0295018 A1* | 10/2017 | Whitehouse | H04L 63/10 |
| 2017/0346862 A1* | 11/2017 | Hanhirova | H04L 63/102 |
| 2017/0359346 A1* | 12/2017 | Parab | H04L 63/104 |
| 2018/0060361 A1* | 3/2018 | Beveridge | H04L 47/70 |
| 2018/0062955 A1 | 3/2018 | Broda et al. | |
| 2018/0113891 A1 | 4/2018 | Jaskiewicz et al. | |
| 2018/0121082 A1 | 5/2018 | Zhu et al. | |
| 2018/0150384 A1 | 5/2018 | Alaranta et al. | |
| 2018/0232194 A1 | 8/2018 | Chen | |
| 2018/0239658 A1 | 8/2018 | Whitner et al. | |
| 2018/0270122 A1 | 9/2018 | Brown et al. | |
| 2018/0276266 A1 | 9/2018 | Diwakar | |
| 2018/0287856 A1 | 10/2018 | Whitner et al. | |
| 2019/0020659 A1* | 1/2019 | Loni | G06F 21/629 |
| 2019/0057534 A1 | 2/2019 | Henry et al. | |
| 2019/0138995 A1 | 5/2019 | Currin et al. | |
| 2019/0229922 A1* | 7/2019 | Galloway | G06F 21/6218 |
| 2019/0272085 A1 | 9/2019 | Radhakrishnan Lakshmi | |
| 2019/0317754 A1 | 10/2019 | Mosquera et al. | |
| 2019/0354835 A1* | 11/2019 | Mac | G06N 3/0481 |
| 2019/0377887 A1* | 12/2019 | Bedi | H04L 63/105 |
| 2020/0021505 A1 | 1/2020 | Vinnakota et al. | |
| 2020/0036522 A1* | 1/2020 | Willnauer | G06F 21/45 |
| 2020/0110796 A1* | 4/2020 | Tsabba | G06F 8/38 |
| 2020/0133550 A1* | 4/2020 | Willnauer | G06F 3/0641 |
| 2020/0134750 A1* | 4/2020 | Wolf | H04L 63/0407 |
| 2020/0184090 A1* | 6/2020 | Grand | G06F 21/6209 |
| 2020/0202020 A1* | 6/2020 | Ewing | G06F 9/451 |
| 2020/0272307 A1 | 8/2020 | Neirynck | |
| 2020/0328952 A1 | 10/2020 | Makwarth et al. | |
| 2021/0124478 A1 | 4/2021 | Reese et al. | |

OTHER PUBLICATIONS

Kuhlmann, Mirco, Karsten Sohr, and Martin Gogolla. "Comprehensive two-level analysis of static and dynamic rbac constraints with uml and ocl." In 2011 Fifth International Conference on Secure Software Integration and Reliability Improvement, pp. 108-117. IEEE, 2011. (Year: 2011).*

Zhang, Lei, Le Chen, Feng Jing, Kefeng Deng, and Wei-Ying Ma. "EnjoyPhoto: a vertical image search engine for enjoying high-quality photos." In Proceedings of the 14th ACM international conference on Multimedia, pp. 367-376. 2006. (Year: 2006).*

Pham, Van Nha, Long Thanh Ngo, and Thao Duc Nguyen. "Feature-reduction fuzzy co-clustering algorithm for hyperspectral image segmentation." In 2017 IEEE International Conference on Fuzzy Systems (FUZZ-IEEE), pp. 1-6. IEEE, 2017. (Year: 2017).*

Elasticsearch security privileges guide ("guide"), eslatic.co/guide/en/elasticsearch/reference/master/security-privileges.html, Jun. 23, 2017, 7 pages (Year: 2017).*

Kim, Sangsig, Dae-Kyoo Kim, Lunjin Lu, Sooyong Park, and Suntae Kim. "A feature-based modeling approach for building hybrid access control systems." In 2011 Fifth International Conference on Secure Software Integration and Reliability Improvement, pp. 88-97. IEEE, 2011. (Year: 2011).*

Franqueira, Virginia, and Roel Wieringa. "Role-based access control in retrospect." Computer 45, No. 6 (2012): 81-88. (Year: 2012).*

Grand, Adrien, "Document-Level Attribute-Based Access Control," U.S. Appl. No. 16/212,475, filed Dec. 6, 2018, Specification, Claims, Abstract, and Drawings, 37 pages.

Ewing, Courtney, "Methods and Systems for Access Controlled Spaces for Data Analytics and Visualization," U.S. Appl. No. 16/226,138, filed Dec. 19, 2018, Specification, Claims, Abstract, and Drawings, 47 pages.

Seifermann, Valentin, "Application Performance Monitoring in Microservice-Based Systems," Institute of Software Technology—Reliable Software Systems, University of Stuttgart, 2017; 85 pages.

Willnauer, Simon Daniel, "Default Password Removal," U.S. Appl. No. 16/047,959, filed Jul. 27, 2018, Specification, Claims, Abstract, and Drawings, 37 pages.

* cited by examiner

Management / Spaces / Default

Edit space
Organize your saved objects into meaningful categories.

Customize your space
Name your space and customize its avatar.
The url identifier cannot be changed.

Name: Default
Description (Optional): This is your default space!
Avatar: D

The description appears on the space selection screen.

Customize feature display (all features visible) hide.
Control which features are visible in this space.
The feature is hidden in the UI, but is not disabled.
Want to secure access ? Go to Roles.

| Feature | Show? |
|---|---|
| ⊘ Discover | ☑ |
| 📊 Visualize | ☑ |
| 🖥 Dashboard | ☑ |
| 🛠 Dev tools | ☑ |
| ⚙ Advanced Settings | ☑ |
| 🗂 Index Pattern Management | ☑ |
| 📈 Timelion | ☑ |
| ✦ Graph | ☑ |
| 🖧 Stack Monitoring | ☑ |
| 🧠 Machine Learning | ☑ |
| 🧩 Apm | ☑ |
| 🗺 Maps | ☑ |
| 🎨 Canvas | ☑ |
| 🌐 Infrastructure | ☑ |
| 📋 Logs | ☑ |
| ⏱ Uptime | ☑ |

[ Update space ]  Cancel     Want to assign a role to a space ? Go to Roles.

Sidebar:
- Elasticsearch
  - Index Management
  - Index Lifecycle Policies
  - Rollup Jobs
  - Cross Cluster Replication
  - Remote Clusters
  - Watcher — 402
  - License Management
  - 9.0 Upgrade Assistant
- Kibana
  - Index Patterns
  - Saved Objects
  - Spaces
  - Reporting
  - Advanced Settings
- Logstash
  - Pipelines
- Beats
  - Central Management — 404
- Security
  - Users
  - Roles

| Space Config | Role Config | Result |
|---|---|---|
| Feature Hidden | Feature Disabled | Feature not Available |
| Feature Hidden | Feature Enabled | Feature not Available |
| Feature Visible | Feature Disabled | Feature not Available |
| Feature Visible | Feature Enabled | Feature Available ⟵ 502 |

FIG. 5

Management / Users / Create

Create role
Set privileges on your Elasticsearch data and control access to your Kibana spaces.

Role name
[_____602_____]

Elasticsearch  hide

Cluster privileges
Manage the actions this role can perform against your cluster. Learn more

[_____ v]

Run As privileges
Allow requests to be submitted on the behalf of other users. Learn more

Add a user...

Index privileges
Control access to the data in your cluster. Learn more

| Indices | Privileges |
|---|---|
| [_____ v] | [_____ v] |

☒ Grant read privileges to specific documents

Granted fields (optional)
[⊗ v]

⊕ Add index privilege

Kibana  hide

🔒
The role does not grant access to Kibana
604
⊕ Add Space privilege

[Create role]  Cancel

Sidebar:
- Elasticsearch
  - Index Management
  - Index Lifecycle Policies
  - Rollup Jobs
  - Cross Cluster Replication
  - Remote Clusters
  - Watcher
  - License Management
  - 9.0 Upgrade Assistant
- Kibana
  - Index Patterns
  - Saved Objects
  - Spaces
  - Reporting
  - Advanced Settings
- Logstash
  - Pipelines
- Beats
  - Central Management
- Security
  - Users
  - Roles

Management / Users / Create

Create role
Set privileges on your Elasticsearch data and control access to your Kibana.

Role name: [                    ]

🔍 Elasticsearch hide

Cluster privileges
Manage the actions this role can perform against your cluster. Learn more

[                    ∨]

Run As privileges
Allow requests to be submitted on the behalf of other users. Learn more

[ Add a user...    ∨]

Index privileges
Control access to the data in your cluster. Learn more

| Indices | Privileges |
|---|---|
| [         ∨] | [         ∨] |

⊗ Grant read privileges to specific documents

[⊕ Add index privilege]

Granted fields (optional)
[ * ⊗  ∨]                                                    🗑

☒ Kibana hide — 802

Kibana privileges
Specifies the Kibana privilege for this role.    [ None    ∨] — 804

[Create role]  Cancel

Sidebar:
- 🔍 Elasticsearch
  - Index Management
  - Index Lifecycle Policies
  - Rollup Jobs
  - Cross Cluster Replication
  - Remote Clusters
  - Watcher
  - License Management
  - 9.0 Upgrade Assistant
- ☒ Kibana
  - Index Patterns
  - Saved Objects
  - Reporting
  - Advanced Settings
- Logstash
  - Pipelines
- Beats
  - Central Management
- Security
  - Users
  - Roles

```
features: {
        discover: {
          all: [
            'login:',
            `version:${version}`,
            'app:kibana',
            'ui:catalogue/discover',
             'ui:navLinks/kibana:discover',
             'saved_object:search/bulk_get',    ⟵ 1102
             'saved_object:search/get',
             'saved_object:search/find',
             'saved_object:search/create',
             'saved_object:search/bulk_create',
             'saved_object:search/update',
             'saved_object:search/delete',   ⟵ 1104
             'saved_object:url/bulk_get',
             'saved_object:url/get',
             'saved_object:url/find',
             'saved_object:url/create',
             'saved_object:url/bulk_create',
             'saved_object:url/update',
             'saved_object:url/delete',
             'saved_object:config/bulk_get',
             'saved_object:config/get',
             'saved_object:config/find',
             'saved_object:index-pattern/bulk_get',
             'saved_object:index-pattern/get',
             'saved_object:index-pattern/find',
             'ui:savedObjectsManagement/Search/delete',
             'ui:savedObjectsManagement/Search/edit',
             'ui:savedObjectsManagement/Search/read',
             'ui:savedObjectsManagement/url/delete',
             'ui:savedObjectsManagement/url/edit',
             'ui:savedObjectsManagement/url/read',
             'ui:savedObjectsManagement/config/read',
             'ui:savedObjectsManagement/index-pettern/read',
             'ui:discover/show',
             'ui:discover/save',
        ],
```

```
read: [
            'login:',
            `version:${version}`,
             'app:kibana',
              'ui:catalogue/discover',
                'ui:navLinks/kibana:discover',
                'saved_object:config/bulk_get',
                'saved_object:config/get',
                'saved_object:config/find',
                'saved_object:index-pattern/bulk_get',
                'saved_object:index-pattern/get',
                'saved_object:index-pattern/find',
                'saved_object:search/bulk_get',     ⸺1202
                'saved_object:search/get',
                'saved_object:search/find',
                'saved_object:url/bulk_get',
                'saved_object:url/get',
                'saved_object:url/find',
                'ui:savedObjectsManagement/config/read',
                'ui:savedObjectsManagement/index-pattern/read',
                'ui:savedObjectsManagement/Search/read',
                'ui:savedObjectsManagement/url/read',
                'ui:discover/show',
          ],
   },
```

The following is an example of registering a feature:

```
server.plugins.xpack_main.registerFeature({
  id: 'foo',
  name: 'Foo feature',
  icon: 'fooApp'
  navLinkId: 'foo',
  app: ['foo', 'kibana'],
  catalogue: ['foo'],
  mangement: {
    kibana: ['foo'],
  },
  privileges: {
    all: {
      api: ['foo/execute'],
      savedObject: {
        all: ['foo'],
        read: ['config', 'index-pattern'],
      },
      ui: ['delete', 'save', 'show'],
    },
    read: {
      savedObject: {
        all: [],
        read: ['config', 'index-pattern', 'graph-workspace']
      },
      ui: ['show'],
    }
  }
});
```

1402
Providing a user interface for enabling a selection of a type of access to grant for each feature of a plurality of features, the selection being on a feature-by-feature basis and the selection being assigned to one or more selected roles

1404
In response to the selection of the type of access, automatically controlling the type of access to each of the features of the plurality of features

1406
The automatic controlling, for a particular feature of the plurality of features, including determining whether a user has any role of the one or more selected roles to which the particular feature has been assigned

1408
Based on the determining, for users having any of the one or more selected roles, permitting the type of access selected for the particular feature assigned to the one or more selected roles

FIG. 14

CONFIGURABLE FEATURE LEVEL CONTROLS FOR DATA

CROSS-REFERENCE TO RELATED APPLICATIONS

This application is related to U.S. patent application Ser. No. 16/226,138, entitled "Methods and Systems for Access Controlled Spaces for Data Analytics and Visualization", filed Dec. 19, 2018, which is incorporated by reference in its entirety herein.

FIELD

The present technology pertains in general to data visualization and more specifically, to providing configurable privileges and control for data.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for providing configurable feature level for data. The data aspect may include data visualization and data analysis in some embodiments. Features are also referred to as applications and may be a plug-in. Various embodiments provide granular application privileges.

An exemplary computer-implemented method includes providing a user interface for enabling a selection of a type of access to grant for each feature of a plurality of features, the selection being on a feature-by-feature basis and the selection being assigned to one or more selected roles. In some embodiments, if access is limited to certain spaces, the plurality of features for a particular space is limited to only those features that are visible for all users for the particular space. In response to the selection of the type of access, method may include automatically controlling the type of access to each of the features of the plurality of features, the automatic controlling, for a particular feature of the plurality of features, including determining whether a user has any role of the one or more selected roles to which the particular feature of the plurality of features has been assigned; and based on the determining, for users having any of the one or more selected roles, permitting the type of access selected for the particular feature of the plurality of features assigned to the one or more selected roles.

In various embodiments, each of the plurality of features is an application (e.g., software) within an environment, where the environment comprises data and may include data visualization and data analysis. The visualizations may include dashboards, histograms, line graphs, or pie charts. The types of access may include whether the feature is visible to the users having particular roles. The types of access can comprise different privileges with respect to the feature. In some embodiments, the types of access selectable via the user interface include granting no access, read-only access, and full access to the feature. In other embodiments, differing levels of access can be granted per application, based on whatever the application or plug-in desires.

Spaces may be included such that the method may further include, based on at least one role of a user, automatically limiting access to the user to one or more spaces of the spaces, such that the one or more spaces is accessible to the user, each space of plurality of spaces containing a number of saved objects, the saved objects being dashboards, visualizations, or other objects. The method may also provide another user interface for enabling selecting whether each feature of the plurality of features is visible or hidden for a particular space of the spaces. The automatically controlling may also be a function of whether the user is in the particular space and whether the feature has been selected as visible or hidden for the particular space. In some embodiments, the automatically controlling includes determining whether the user is in a particular space and whether the feature has been selected as visible or hidden for that particular space and permitting the selected type of access only if the user is determined to be in a particular space, if it is determined that the selected feature is visible for the particular space, and if the feature is enabled for the role of the user.

Registering functionality may be included, such that the method provides for registering at least some of the features of the plurality of features to declare actions permitted for full access, actions permitted for read-only access, and/or actions permitted for differing levels of access for the particular application/plug-in. The automatically controlling the type of access to each of the feature of the plurality of features, may be a function of the registering. The registering may further include declaring corresponding user interface capabilities that are part of the feature.

In various embodiments, a system is provided including a processor and a memory communicatively coupled to the processor, the memory storing instructions executable by the processor to perform the method summarized above.

In some embodiments, the system comprises a processor; and a memory communicatively coupled to the processor, the memory storing instructions executable by the processor to perform a method for providing configurable feature level controls for data, the method comprising, based on at least one role of a user, automatically controlling on a feature-by-feature basis privileges of a user to access features of a plurality of features, each of the plurality of features being applications within an environment. The automatically controlling can include creating a set of rules for configuring an environment so only a certain set of users is able to use certain applications in a distributed, multitenant-capable full-text search engine environment.

BRIEF DESCRIPTION OF THE DRAWINGS

Embodiments are illustrated by way of example, and not by limitation, in the figures of the accompanying drawings, in which like references indicate similar elements and in which:

FIG. 4 illustrates an example UI for space driven feature controls for customizing a space configurable for various data visualization and customizing a feature display within the space, according to an example embodiment.

FIG. 5 illustrates an example table illustrating, having security and spaces enabled, results for combinations of space configuration and role configuration with respect to features being visible or hidden and enabled or disabled, according to an example embodiment.

FIG. 6 illustrates an example UI, for when spaces is enabled, for creating a role and assigning privileges to features in that space to that role for configuring access, according to an example embodiment.

FIG. 7 illustrates an example UI for customizing feature controls regarding privileges for each feature within an example space, according to an example embodiment.

FIG. 8 illustrates an example UI, for when spaces is disabled, for role management for specifying which features are allowed within the platform for a case, according to an example embodiment.

FIG. 11 illustrates an example of the actions that are associated with "All" privileges for an example feature/application, according to an example embodiment.

FIG. 12 illustrates an example of the actions that are associated with "Read" privileges for an example feature/application, according to an example embodiment.

FIG. 13 illustrates an example of registering a feature, according to an example embodiment.

FIG. 14 is a simplified flow diagram of a method, according to an example embodiment.

DETAILED DESCRIPTION

Figure 1:
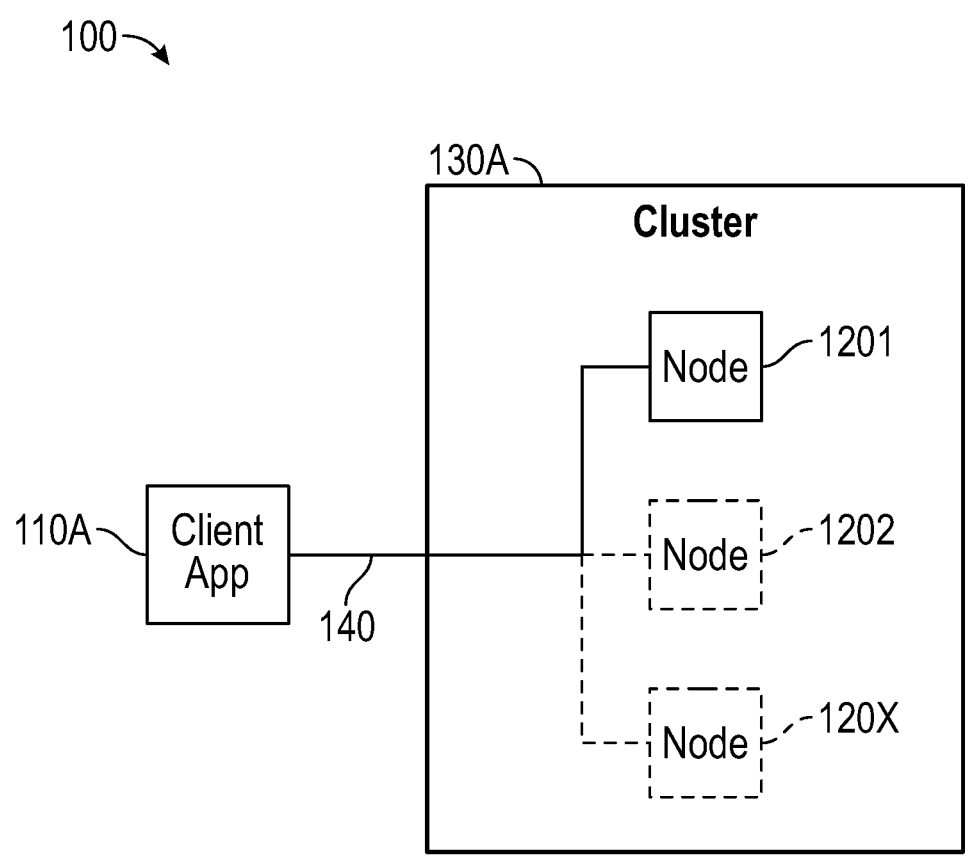
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for providing configurable features control for data, e.g., for data visualization and data analysis.

Figure 2:
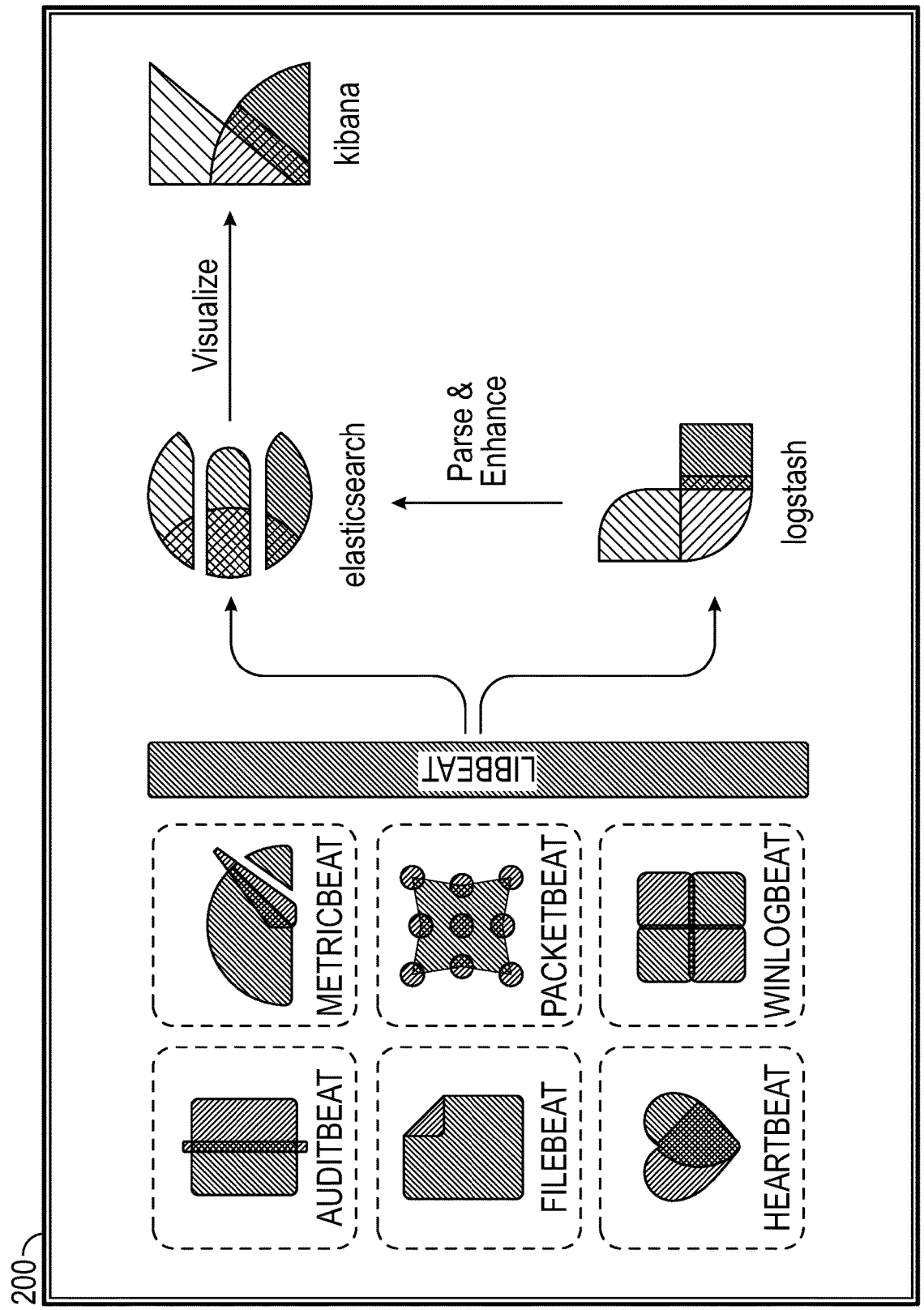
FIG. 2 is an example overall diagram illustrating various aspects and process flow, according to example embodiments.
Figure 3:
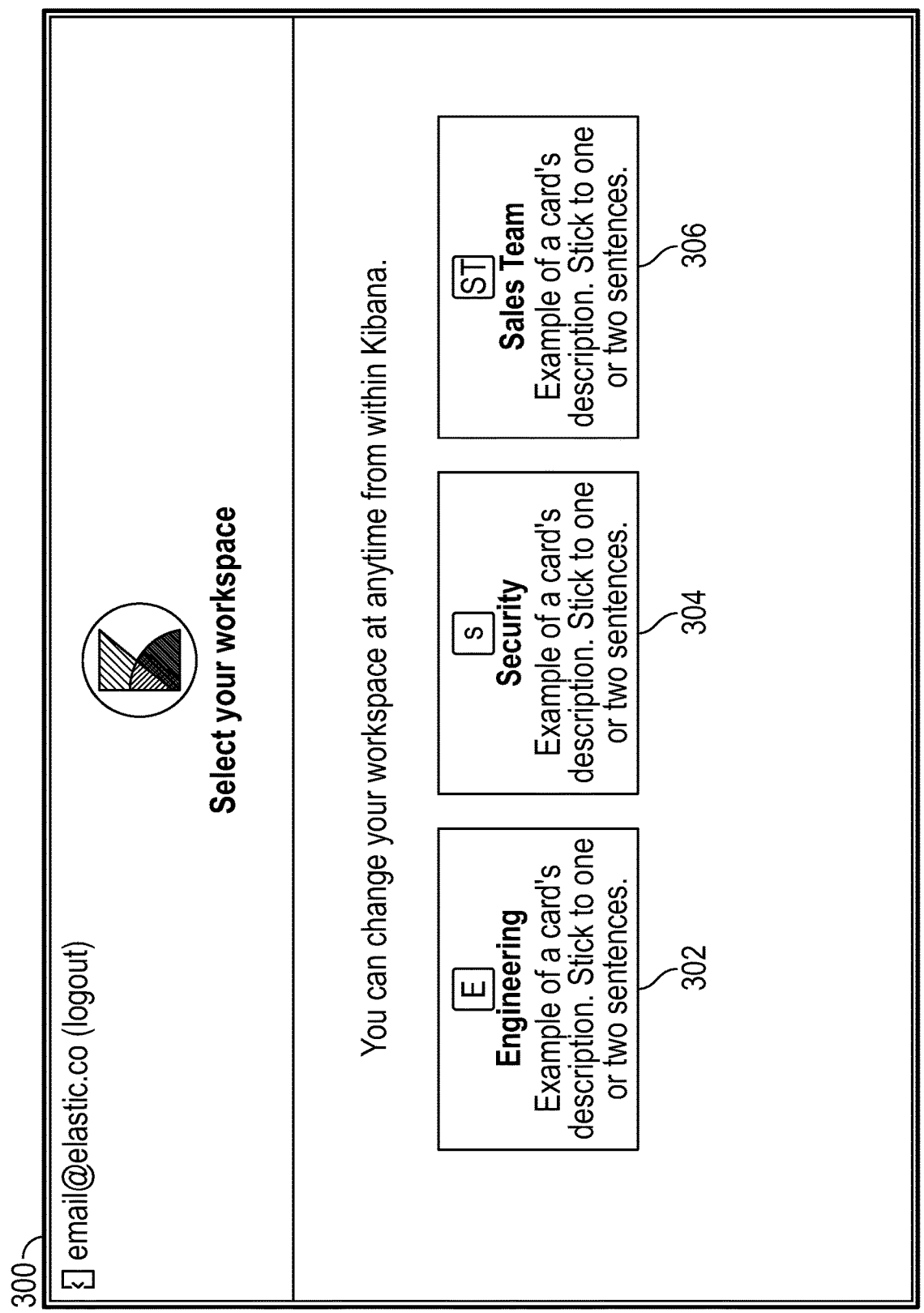
FIG. 3 is an example user interface (UI) showing multiple selectable spaces for a user which may be used for some embodiments.

FIGS. 1-3 provide an overview of the overall system and some aspects, such as KIBANA SPACES, that may be used for some embodiments. It should be noted that other embodiments may be configured for use without KIBANA SPACES.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 110A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 1500 of FIG. 15. Virtual machines may provide a substitute for a physical computing system and the functionality needed to execute entire operating systems.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further detailing aspects of the present technology according to various embodiments.

Although various example embodiments are described herein with respect to KIBANA and other elements of an integration solution called ELASTIC STACK, the present technology is not so limited.

KIBANA provides for data visualization and exploration, for example, for log and time-series data analytics, application monitoring, and other use cases regarding a user's data on its servers, cloud-based services used, etc.

FIG. 2 is an example diagram of a system 200 illustrating KIBANA connections and flow with respect to other aspects of an integrated solution referred to as ELASTIC STACK. BEATS can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). BEATS can send data directly into ELASTICSEARCH or via LOGSTASH (a data-collection and log-parsing engine) where it can be further processed and enhanced before visualizing, analyzing and exploring it using KIBANA). Although FIG. 2 includes KIBANA and other particular aspects and components, the present technology is not limited to utilizing some or all of the components and aspects.

KIBANA can provide a powerful and easy-to-use visual interface with features such as histograms, line graphs, pie charts, sunbursts and the can enable a user to design their own visualization, e.g., leveraging the full aggregation capabilities of the ELASTICSEARCH (a distributed, multi-tenant-capable full-text analytics and search engine). In that regard, KIBANA can provide tight integration with ELASTICSEARCH for visualizing data stored in ELASTICSEARCH. KIBANA may also leverage the Elastic Maps Service to visualize geospatial data, or get creative and visualize custom location data on a schematic of the user's choosing. Regarding time series data, KIBANA can also perform advanced time series analysis on a company or other user's ELASTICSEARCH data with provide curated time series user interfaces (UI)s. Queries, transformations, and visualizations can be described with powerful, easy-to-learn expressions. Relationships can be analyzed with graph exploration.

With KIBANA, a user may take the relevance capabilities of a search engine, combine them with graph exploration, and uncover the uncommonly common relationships in the user's ELASTICSEARCH data. In addition, KIBANA can enable a user to detect the anomalies hiding in a user's ELASTICSEARCH data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA.

It can be provided for the user to share visualizations and dashboards (e.g., KIBANA or other visualizations and dashboards) within a space or spaces (e.g., using KIBANA SPACES), with others, e.g., a user's team members, the user's boss, their boss, a user's customers, compliance managers, contractors, while having access controlled.

Various embodiments of the methods and systems of the present technology provide configurable features control for data, for example, for data visualization and/or data analysis to name a few. This may also be referred to herein as providing configurable granular application privileges.

Some embodiments are configured for KIBANA SPACES which is a plug-in that enables a user to organize their saved objects, which may be dashboards, visualizations, or other saved objects, into spaces. Plug-ins may also be referred to herein as applications. KIBANA SPACES is described further in U.S. patent application Ser. No. 16/226,138, filed Dec. 19, 2018, incorporated by reference in its entirety herein. In other embodiments, KIBANA SPACES is not required for using the present technology. One of the user interfaces for KIBANA SPACES is described with reference to FIG. 3 below.

FIG. 3 is an example user interface 300 showing multiple selectable spaces for a user. In this example, there is an Engineering team 302, a Security team 304, and a Sales team 306 which the user is allowed to choose (e.g., space chooser). Administrators or others can setup these spaces.

When a user logs in, if it is determined that the user's role(s) and/or attribute(s) has access to the particular space, then the method and system can prompt the user with the ability to select that space. In the example in FIG. 3, an interface may be presented when a user logs in which shows certain selectable spaces that the user can access. More specifically, the user is prompted with the Engineering space 302, Security space 304 and Sales team space 304 from which the user can make a selection. This, in effect, can transform the experience of interacting with the visualization platform to tailor it for the particular spaces. The user logging in and seeing the user interface 300 may only see applications that are associated the three spaces, 302, 304, and 306. For example, if the user selects the sales team's space 306, that space 306 may be configured to provide access only to certain data objects and to certain applications associated with the sales team space 306. In this example, the user selecting the sales team space 306 can only see the dashboards, visualizations, and index patterns associated with that particular space. Index patterns can be patterns regarding how to query and where to query the search engine for data.

The particular spaces that a user can select can be determined by an administrator based on the user's roles and/or attributes. If the methods and systems according to various embodiments determine that the user does not have access to a particular space, then that particular space will not be visible or selectable by the user in the UI, e.g., the user will not see it and won't even know the other spaces exist or the existence of saved objects within those other inaccessible spaces.

Each space may be independent in the sense that objects unique to a first space do not appear in a different, second space.

In some embodiments, a dashboard only mode is configurable on a space by space basis. For example, one of the selectable spaces may be configured to provide a dashboard-only mode, where based on the role and/or attributes of a particular user, that particular user may only be given read only access to marketing dashboards and operational dashboards, while other selectable spaces may be configured to provide fuller access.

In various embodiments, many discrete sets of data can be made secure from each other. In an example common use case, it may be desired to have read only access to KIBANA and to also have many discrete sets of data that are secure from each other. To achieve this prior to the present technology, a large number of KIBANA instances would have to be deployed and managed separately which can be burdensome and cumbersome. In various embodiments, the user need not have to do that in order to manage, e.g., discrete data sets, etc.

The ability can be provided to select which space is a default space. For the default space, in response to the user logging in, the system can immediately drop the user into a particular default space. For example, a user on the engineering team, may want to always be logged into the engineering space first and just have the option to switch to the other ones if the user desires.

In various embodiments, a user can invite other users into certain spaces (and not others) using role-based access control or attribute-based access control. Spaces can allow users to organize their dashboards, visualizations, and other saved objects into meaningful categories based on team, use case, individual, etc. Using role-based access control, security can be layered in to control who can (and cannot) view and/or edit which space. If an organization has a shared KIBANA instance with hundreds of dashboards and visualizations, for example, spaces can allow the organization to deliver a more organized and secure experience to the end users. Spaces can also be configured to not allow certain applications to be used in the particular space as will be described further herein.

Each space can be a secure container for a user to put in many different saved objects in KIBANA—dashboards, visualizations, saved objects, index patterns (to indicate which search engine indices a user wants to explore), advance settings, timeline expressions, etc. that would normally get bundled into one KIBANA index with access to everyone. These spaces can be isolated into individual containers in the UI. This can allow a user to do any sort of grouping they desire.

Given the overview above, further details are described below regarding various embodiments for providing configurable feature/application level privileges and controls for data, e.g., for data visualization, data analysis, etc.

Data visualization and analysis platforms, such as KIBANA, may provide or be composed of many individual applications, otherwise referred to features, which can be plug-ins. These applications can provide various functionality, e.g., to build visualizations differently, build customized dashboards, or other customized data analysis. Users of such platforms find it very beneficial to have ways to restrict which other users are able to have access to various applications and where access is permitted, to control the level of access to those applications. In essence, it is desirable for users to be able to create a set of rules that essentially configure the system so only a certain set of users is able to use certain applications. In various embodiments, the method provides for a user to configure the system with respect to features/applications.

FIG. 4 illustrates an example UI 400 for space driven feature controls for customizing a space configurable for data (various data visualization and analysis) and customizing feature display within the space, according to an example embodiment. The space name and avatar can be chosen at 402. A customize feature display portion of the UI is identified at 404. In the example UI 404, the method provides for controlling which features are visible in the space and which are hidden. The default may be to "show" features so they are visible. Setting the "show" selection off can set the particular feature (e.g. Discover . . . Uptime) to be hidden. Features which are in a hidden state may not be visible in the user interface, but are not otherwise disabled in various embodiments.

For example, it can be possible to set a configuration such that inside a certain space, the dashboard applications (features) are all hidden. The method can provide for a user to control who is able to access a certain set of features, e.g. dashboard applications within a certain space. All features may be enabled by default until they are explicitly disabled or otherwise restricted by a user.

In various embodiments, the method provides features control for data which can include control regarding data. In some embodiments, the data concerns data visualization and may also concern data analysis. If a space is defined to include a set of features and a user is permitted to access that space, the user may also need to have a role which brings them access to the particular feature. So, in some embodiments, the space needs to have that feature enabled and the user needs to have a role which brings them access.

In addition to customizing the space to have features visible or not, security may be provided in some embodiments to also configure features depending on the role of a user. From a security perspective, access can depend on roles setup for particular features, e.g., only users in certain roles might be able to access a particular feature. Thus, if security plug-in is installed, restrictions on a user-by-user basis can be configured for each application/feature (e.g., also referred to as security driven feature privileges). The user basis may be by role, by attribute, etc. and the restrictions might only be set by an administrator who can, for example, create and edit spaces to disable or enable certain applications/features within the space. In contrast, without the security plug-in being installed, the user may be able to hide certain applications/features to all users for an entire space (e.g., spaces driven feature controls). Without the security plug-in, for instance, any user who has access to a particular space might change which applications/features are hidden in the space.

FIG. 5 illustrates an example table 500 illustrating, when both security and spaces (e.g., plug-ins) aspects are enabled, results for combinations of space configuration and role configuration with respect to features being visible or hidden and enabled or disabled, according to an example embodiment. As shown in the example in FIG. 5, the resultant configuration may be that a certain feature is not available to a particular user unless the space is configured for that feature to be visible, and the role(s) of the particular user are such that access to that feature is permitted, as shown at 502 in table 500.

FIG. 6 illustrates an example UI 600, for when the spaces feature is enabled, for creating a role and assigning privileges to features in that space to that role for configuring access, according to an example embodiment. A role name may be specified at 602.

Controlling privileges can be more granular such that privileges can be assigned at a lower, feature level according to various embodiments. An "Add space privileges" selection, in the example, in FIG. 6, is identified at 604.

In response to user selection to add space privileges, a UI for providing to the user the functionality to customize by feature can be presented.

Figure 7:
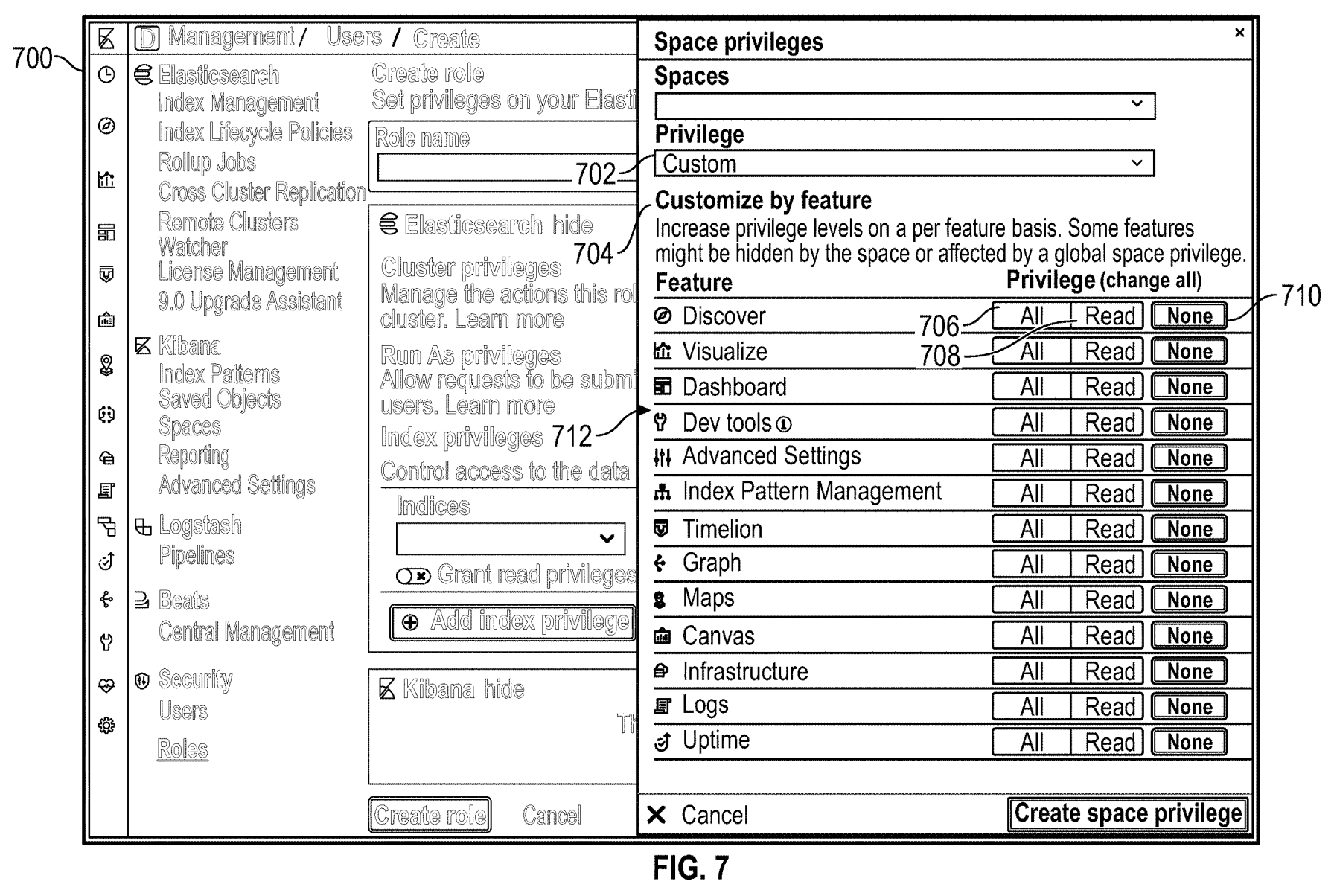

FIG. 7 illustrates an example UI 700 for customizing feature controls regarding privileges for each feature within an example space, according to an example embodiment. In this example, base level privileges "All", "Read" (e.g., read-only), and "None" can be set for all features. In various embodiments, the UI 700 also provides for setting custom privileges 702 by feature in section 704. More specifically, in this example, for each feature (Discover . . . Uptime) 712, the method provides for the user to select an "All" privilege level at 706, a "Read" only privilege level at 708 and no access to that feature by selecting the "None" selection 710. For example, the "Dashboard" feature could be set with privilege as "All" access, while the "Maps" feature could be set with just "Read" privileges to describe just one of the many combinations possible. As described above, features might be otherwise hidden or restricted at a global level or for the particular space associated with the features, which can override the ability to customize some or all of the features. Features (Discover . . . Uptime) 712 are examples only for an example space. Other features may be available for the group of features for a particular space. For example, KIBANA (or another visualization and analysis platform) can be structured internally such that everything is considered to be a plugin so it can be possible to disable the "spaces" plugin inside of KIBANA and still use security driven feature privileges to hide various features for different users. Customization of features can also be available even if the spaces functionality is disabled, in some embodiments.

FIG. 8 illustrates an example UI, for when spaces is disabled, for role management for specifying which features are allowed within the platform for a case, according to an example embodiment. In this example, when spaces are disabled, a Role Management UI (screen) such as 800 is provided to allow users to specify which features users are allowed to access within the visualization and analytics platform, e.g., KIBANA. In various embodiments, configuring in this manner does not preclude users from later enabling spaces (e.g., KIBANA SPACES).

In this example, 802 in the UI 800 provides for specifying granular role privileges. In response to selection at 804 in the UI 800 a menu can be presented to allow the option to customize access.

Figure 9:
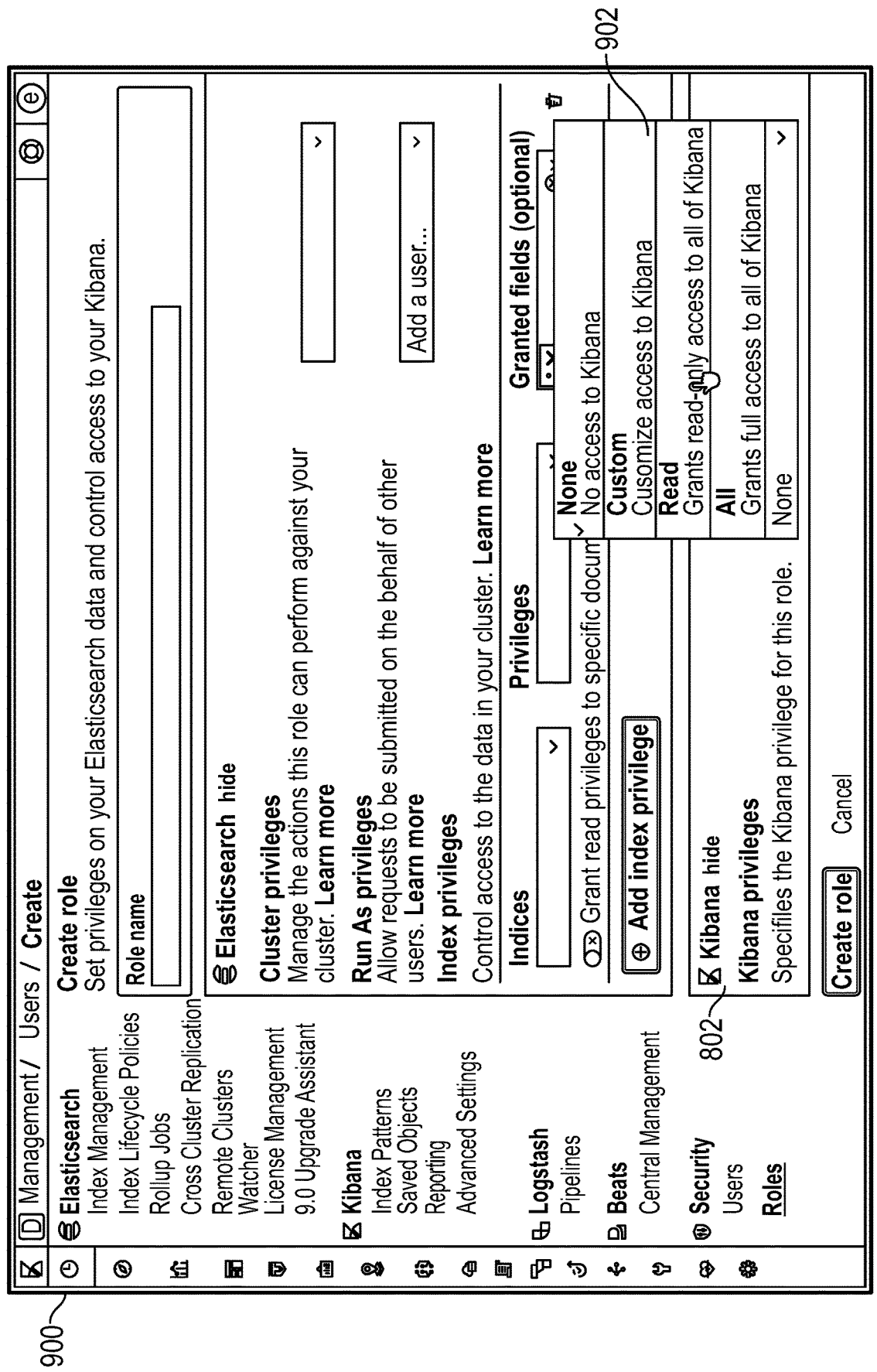
FIG. 9 illustrates an example UI for the UI in FIG. 8 for selecting whether to customize privileges by feature, according to an example embodiment.

FIG. 9 illustrates an example UI 900 for the UI in FIG. 8 for selecting whether to customize privileges by feature, according to an example embodiment. In various embodiments, the UI 900 is presented in response to user selection (e.g., at 804 shown in FIG. 8) and can provide options at 902 for "None" (no access to KIBANA), Custom (customize access to KIBANA), Read (read-only access to all of KIBANA) or "All" (grant full access to all of KIBANA). In some embodiments, the differing levels of access can be granted per application or plug-in, based on whatever level the application or plug-in desires. KIBANA is shown for this example, however, other suitable visualization and/or analytics platforms may be used for practicing various embodiments of the present technology.

In response to the customizing option being select (e.g. at "Custom" at 902), the method can present options for the user to set privileges feature-by-feature in an environment where there are no spaces, e.g., KIBANA SPACES being disabled.

Figure 10:
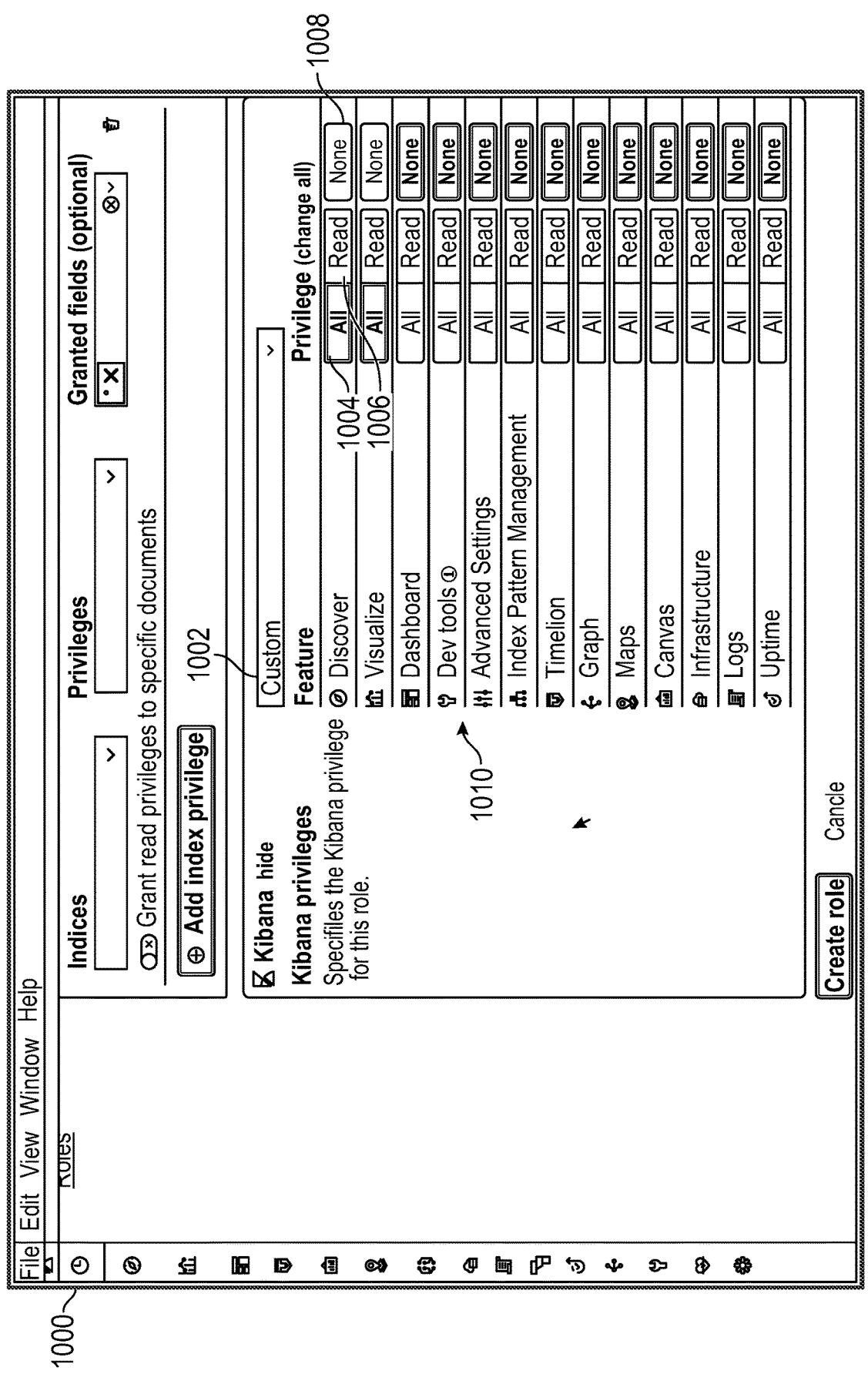
FIG. 10 illustrates an example UI for customizing privileges by feature, according to an example embodiment.

FIG. 10 illustrates an example UI 1000 for customizing a role's privileges feature-by-feature in an environment when the spaces plug-in is disabled, according to an example embodiment. That is, UI 1000 provides a user with the functionality to customize access privilege feature-by-feature even where there has not been a space or spaces provided in which the user can share visualizations and dashboards (e.g., KIBANA or other visualizations and dashboards) within a space or spaces (e.g., using KIBANA SPACES), with others, e.g., a user's team members, the user's boss, their boss, a user's customers, compliance managers, contractors, while having access controlled.

For the example UI 1000, for the customizing functionality selected at 1002, each listed feature (Discover . . . Uptime) 1010, the method provides for the user to select, for the selected role, an "All" privilege level at 1004, a "Read" only privilege level at 1006 and no access to that feature by selecting the "None" selection 1008. In some embodiments, the differing levels of access can be granted per application or plug-in, based on whatever level the application or plug-in desires. For example, the "Dashboard" feature could be set with privilege of "Read" to not permit the particular role to change any of the dashboards, while also setting "All" provides for the "Logs" application/feature/plug-in. In various embodiments, the privileges set in the UI 1000 are not at a spaces level, but features might be otherwise hidden or restricted at a global level—for all roles—which can override the ability to customize some or all of the features. Features (Discover . . . Uptime) 1010 are examples only, other features/applications/plug-ins may be available for customizing for a particular use case.

Rather than being restricted to just having privileges for "all" features/applications/plug-ins, various embodiments provide granular control to set privileges for features/applications/plug-ins in an environment. In some embodiments, not all features/applications/plug-ins can be controlled in this way.

Some existing applications may implement their own privileges model that require the user to be explicitly granted various cluster and index privileges via a reserved role, which will not be able to be disabled using the security driven feature controls. These existing application having their own privilege model can be, for example, application performance monitoring (APM), machine learning and (other) monitoring which for various reasons require reserved roles. Access to these applications may continue to be driven by the reserved roles. With the feature control according to various embodiments, if the user is assigned the proper reserved role, the application can be visible, e.g., within KIBANA, but not be configurable access-wise. Without such feature controls, those applications could have always been visible, even if the user does not have the necessary privileges, which is certainly undesirable.

FIG. 11 illustrates an example 1100 of the actions that are associated with "All" privileges for an example "Discover" feature for KIBANA, according to an example embodiment. FIG. 12 illustrates an example 1200 of the actions that are associated with "Read" privileges for the example "Discover" feature for KIBANA, according to an example embodiment. In various embodiments, each of these actions corresponds to a specific authorization check which will be performed. For example, to determine whether the user is able to "find" a saved object of type "search", a check is made concerning whether the user has the "saved_object: search/find" action, prior to permitting the user to perform the find operation. There may also be other actions, for example, actions for granting access to KIBANA applications, application programming interfaces (APIs) and various UI capabilities, and other types of actions.

In various embodiments, the differences between the example 1100 and 1200 includes "saved_object:search/find" action for both the "all" and "read", see 1102 and 1202, so the authorization check would permit the user to perform the find operation in either case. In contrast, a "saved_object: search/delete" action appears under "all" at 1104 in FIG. 11 but does not appear as any of the actions for "read" only for the discover feature in FIG. 12; showing the restrictive control that "read" only imposes by permitting the user to perform the find, but not allow the user to perform the delete operation.

In some embodiments, during a plugin's initial lifecycle event, the plugin must register their feature to opt-in to the feature controls functionality (e.g., Feature Controls). If a plugin does not opt-in to Feature Controls, their application may always be visible in the navigation bar; however, they may not be granted authorization to any of the internal subsystems.

FIG. 13 illustrates an example 1300 of registering a feature, according to an example embodiment. This registering can declare up front their features and corresponding UI capabilities that are part of the feature. In this example, everything that is declared outside of the "privileges" subsection is used for both spaces driven feature controls and security driven feature privileges. When a feature is "hidden" using the method, e.g., spaces driven feature controls, the navlink, application, catalogue entry and management sections (outside the "privileges" subsection) are hidden, according to various embodiments.

In some embodiments, the privilege subsection allows the plugin author to determine the access to various subsystems when the user is assigned the feature specific "all" or "read" privileges, and also using the base "all" and "read" privileges. Everything that is declared outside the privileges subsection can implicitly cascade into the privileges themselves. However, the "app", "catalogue" and "management" sections can be override-able at the privilege definition itself. There are additional items which are only used when a security plug-in is enabled for security driven feature privileges, and these may only be specified as part of a privilege itself. These additional items may include authorized APIs, saved object types, and specific UI capabilities.

UI Capabilities may be used for determining which capabilities should be enabled in the UI based on the spaces disabled features and the user's privileges. When a feature is disabled using the spaces plug-in, all UI capabilities that are associated with that specific feature are disabled for that space. Using the security driven feature privileges, different UI capabilities can be enabled or disabled based on the specific privilege. Plug-ins can be required to specify their UI capabilities. If feature registration is used, the method can determine those UI capabilities by those provided during registration.

FIG. 14 is a simplified flow diagram 1400 of a method, according to an example embodiment.

Operation 1402 includes providing a user interface for enabling a selection of a type of access to grant for each feature of a plurality of features, the selection being on a feature-by-feature basis and the selection being assigned to one or more selected roles, as described further herein.

Operation 1404 includes, in response to the selection of the type of access, automatically controlling the type of access to each of the features of the plurality of features, as described further herein.

In operation 1406, the automatic controlling, for a particular feature of the plurality of features, including determining whether a user has any role of the one or more selected roles to which the particular feature has been assigned, as described further herein.

Operation 1408 includes, based on the determining, for users having any of the one or more selected roles, permitting the type of access selected for the particular feature assigned to the one or more selected roles, as described further herein.

Figure 15:
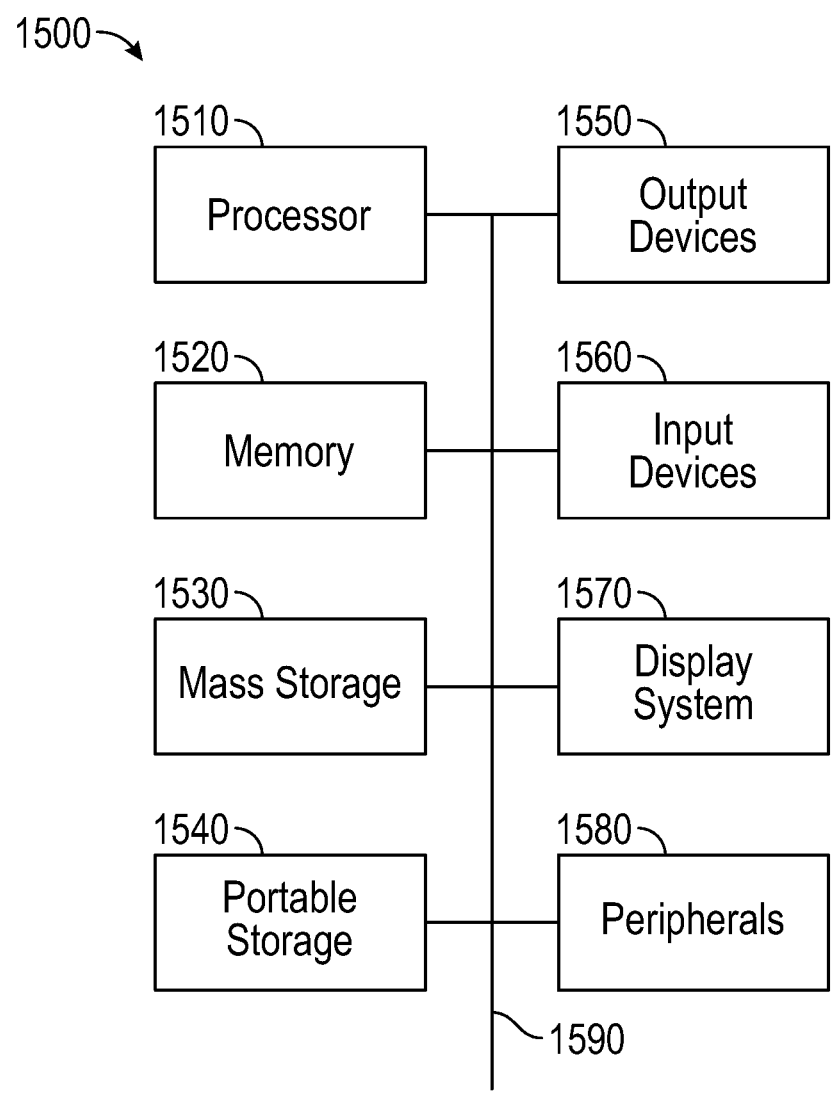
FIG. 15 is a simplified block diagram of a computing system, according to some embodiments.

FIG. 15 illustrates an exemplary computer system 1500 that may be used to implement some embodiments of the present invention. The computer system 1500 in FIG. 15 may be implemented in the contexts of the likes of computing systems, networks, servers, or combinations thereof. The computer system 1500 in FIG. 15 includes one or more processor unit(s) 1510 and main memory 1520. Main memory 1520 stores, in part, instructions and data for execution by processor unit(s) 1510. Main memory 1520 stores the executable code when in operation, in this example. The computer system 1500 in FIG. 15 further includes a mass data storage 1530, portable storage device 1540, output devices 1550, user input devices 1560, a graphics display system 1570, and peripheral device(s) 1580.

The components shown in FIG. 15 are depicted as being connected via a single bus 1590. The components may be connected through one or more data transport means. Processor unit(s) 1510 and main memory 1520 are connected via a local microprocessor bus, and the mass data storage 1530, peripheral device(s) 1580, portable storage device 1540, and graphics display system 1570 are connected via one or more input/output (I/O) buses.

Mass data storage 1530, which can be implemented with a magnetic disk drive, solid state drive, or an optical disk drive, is a non-volatile storage device for storing data and instructions for use by processor unit(s) 1510. Mass data storage 1530 stores the system software for implementing embodiments of the present disclosure for purposes of loading that software into main memory 1520.

Portable storage device 1540 operates in conjunction with a portable non-volatile storage medium, such as a flash drive, floppy disk, compact disk, digital video disc, or Universal Serial Bus (USB) storage device, to input and output data and code to and from the computer system 1500 in FIG. 15. The system software for implementing embodiments of the present disclosure is stored on such a portable medium and input to the computer system 1500 via the portable storage device 1540.

User input devices 1560 can provide a portion of a user interface. User input devices 1560 may include one or more microphones, an alphanumeric keypad, such as a keyboard, for inputting alphanumeric and other information, or a pointing device, such as a mouse, a trackball, stylus, or cursor direction keys. User input devices 1560 can also include a touchscreen. Additionally, the computer system 1500 as shown in FIG. 15 includes output devices 1550. Suitable output devices 1550 include speakers, printers, network interfaces, and monitors.

Graphics display system 1570 include a liquid crystal display (LCD) or other suitable display device. Graphics display system 1570 is configurable to receive textual and graphical information and processes the information for output to the display device. Peripheral device(s) 1580 may include any type of computer support device to add additional functionality to the computer system.

Some of the components provided in the computer system 1500 in FIG. 15 can be those typically found in computer systems that may be suitable for use with embodiments of the present disclosure and are intended to represent a broad category of such computer components. Thus, the computer system 1500 in FIG. 15 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1500 may be implemented as a cloud-based computing environment, such as a virtual machine operating within a computing cloud. In other embodiments, the computing system 1500 may itself include a cloud-based computing environment, where the functionalities of the computing system 1500 are executed in a distributed fashion. Thus, the computing system 1500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for providing configurable feature level controls for data, the method comprising:
    providing a user interface for enabling a selection of a type of access to grant for each feature of a plurality of features of an application, the selection being on a feature-by-feature basis in a layered pattern and the selection being assigned to one or more selected roles, the plurality of features including only those features that are visible for all users for a particular space if access is limited to certain spaces, the particular space being a secure container;
    in response to the selection of the type of access, automatically controlling the type of access to each of the features of the plurality of features, the automatic controlling, for a particular feature of the plurality of features, including:
    determining whether the user has access to the particular space and whether the particular feature has been selected as visible or hidden for the particular space;
    determining whether a user has any role of the one or more selected roles to which the particular feature of the plurality of features has been assigned;
    based on the determining whether a user has any role, for users having any of the one or more selected roles, permitting the type of access selected for the particular feature of the plurality of features assigned to the one or more selected roles; and
    when the application implements a privileges model, the user is granted specific cluster and index privileges associated with a reserved role, which cannot be disabled using security driven feature control; and
    providing for registering at least some of the features of the plurality of features to declare actions permitted for full access, actions permitted for read-only access, and actions permitted for differing levels of access, wherein the particular feature is an application or plug-in.

2. The computer-implemented method of claim 1, wherein each of the plurality of features is an application or plug-in within an environment.

3. The computer-implemented method of claim 2, wherein the environment comprises data.

4. The computer-implemented method of claim 2, wherein the environment comprises data visualization.

5. The computer-implemented method of claim 4, wherein the visualizations comprise dashboards, histograms, line graphs, or pie charts.

6. The computer-implemented method of claim 1, wherein the types of access comprises whether the feature is visible to the users having particular roles.

7. The computer-implemented method of claim 1, wherein the types of access comprises different privileges with respect to the feature.

8. The computer-implemented method of claim 1, wherein the types of access selectable via the user interface include granting: no access, read-only access, full access, or various levels of access, to the feature.

9. The computer-implemented method of claim 1, further comprising:
    based on at least one role of the user, automatically limiting access to the user to one or more spaces of a plurality of spaces, such that the one or more spaces is accessible to the user, each space of the plurality of spaces containing a number of saved objects, the saved objects being dashboards, visualizations, or other objects.

10. The computer-implemented method of claim 9, further comprising:
    providing another user interface for selecting, for each space of the plurality of spaces, whether each feature of the plurality of features is visible or hidden.

11. The computer-implemented method of claim 10, wherein the automatically controlling is also a function of whether the user has access to the particular space and whether the particular feature is visible or hidden for the particular space.

12. The computer-implemented method of claim 11, wherein the automatically controlling is also a function of whether the feature is enabled for the user's role.

13. The computer-implemented method of claim 1, wherein the automatically controlling further comprises:
    determining whether the user has access to the particular space and whether the particular feature has been selected as visible or hidden for the particular space.

14. The computer-implemented method of claim 1, wherein the automatically controlling the type of access to each of the feature of the plurality of features, is a function of the registering.

15. The computer-implemented method of claim 1, wherein the registering further comprises declaring corresponding user interface capabilities that are part of the feature.

16. A system comprising:
    a processor; and
    a memory communicatively coupled to the processor, the memory storing instructions executable by the processor to perform a method, the method comprising:
    providing a user interface for enabling a selection of a type of access to grant for each feature of a plurality of features, the selection being on a feature-by-feature basis in a layered pattern and the selection being assigned to one or more selected roles, the plurality of features including only those features that are visible for a particular space if access is limited to certain spaces, the particular space being a secure container; and in response to the selection of the type of access, automatically controlling the type of access to each of the features of the plurality of features, the automatic controlling, for a particular feature of the plurality of features, including:

determining whether the user has access to the particular space and whether the particular feature has been selected as visible or hidden for the particular space;

determining whether a user has any role of the one or more selected roles to which the particular feature of the plurality of features has been assigned; and based on the determining whether a user has any role, for users having any of the selected one or more roles, permitting the type of access selected for the particular feature of the plurality of features assigned to the one or more selected roles, when an application implements a privileges model, the user is granted specific cluster and index privileges associated with a reserved role which cannot be disabled using security driven feature control; and providing for registering at least some of the features of the plurality of features to declare actions permitted for full access, actions permitted for read-only access, and actions permitted for differing levels of access, wherein the particular feature is an application or plug-in.

17. The system of claim 16, wherein the automatically controlling comprises creating a set of rules for configuring a distributed search engine environment so only a certain set of users is able to use certain applications in the distributed search engine environment.

* * * * *